(12) United States Patent
Ruud et al.

(10) Patent No.: US 8,132,944 B2
(45) Date of Patent: Mar. 13, 2012

(54) RECESSED LED LIGHTING FIXTURE

(75) Inventors: Alan J. Ruud, Racine, WI (US); Kurt S. Wilcox, Libertyville, IL (US); Mario Alberto Castillo, Racine, WI (US)

(73) Assignee: Ruud Lighting, Inc., Racine, WI (US)

( * ) Notice: Subject to any disclaimer, the term of this patent is extended or adjusted under 35 U.S.C. 154(b) by 344 days.

(21) Appl. No.: 12/471,881

(22) Filed: May 26, 2009

(65) Prior Publication Data

US 2009/0290361 A1    Nov. 26, 2009

Related U.S. Application Data

(60) Provisional application No. 61/055,958, filed on May 23, 2008.

(51) Int. Cl.
*F21V 15/00* (2006.01)
(52) U.S. Cl. ......... 362/365; 362/147; 362/237; 362/257
(58) Field of Classification Search .......... 362/364–366, 362/147–150, 237, 240, 244, 326, 327, 329, 362/307, 308, 257, 249.02, 800
See application file for complete search history.

(56) References Cited

U.S. PATENT DOCUMENTS

| | | |
|---|---|---|
| 2,007,033 A | 7/1935 | Williams |
| 2,802,097 A | 8/1957 | Franck |
| 4,767,172 A | 8/1988 | Nichols et al. |
| 5,140,220 A | 8/1992 | Hasegawa |
| 5,894,195 A | 4/1999 | McDermott |
| 5,894,196 A | 4/1999 | McDermott |
| 5,898,267 A | 4/1999 | McDermott |
| 5,924,788 A | 7/1999 | Parkyn, Jr. |
| 5,939,996 A | 8/1999 | Kniveton et al. |

(Continued)

FOREIGN PATENT DOCUMENTS

GB    2282700 A    12/1995

(Continued)

OTHER PUBLICATIONS

Excerpts of International Search Report and Written Opinion for PCT/US09/03198. Date: Jul. 23, 2009. 4 pages.

*Primary Examiner* — Bao Q Truong
(74) *Attorney, Agent, or Firm* — Jansson Shupe & Munger Ltd.

(57) ABSTRACT

A recessed lighting fixture for mounting into a structure facing an illumination area. The fixture includes a support member configured for mounting into the structure and including a front end-portion having an edge defining a light opening and a back end-portion recessed from the opening. The support member and opening have a centerline. A mounting board is disposed at the back end-portion and defines with the support member an open space extending to the opening. An LED arrangement includes (a) LED emitter(s) on the mounting board for directing light toward the opening, each emitter defining an emitter axis, and (b) a lens for each emitter at least one of which is off-centerline in a first lateral direction. The lens is configured for distribution of emitter light in off-axial direction across the open space and passing through the opening at an edge portion that is off-centerline in the opposite lateral direction, thereby to widen the illumination angle from the fixture while having no more than minimal light directed onto the support member.

19 Claims, 16 Drawing Sheets

U.S. PATENT DOCUMENTS

| | | |
|---|---|---|
| 6,481,130 B1 | 11/2002 | Wu |
| 6,560,038 B1 | 5/2003 | Parkyn, Jr. et al. |
| 7,021,797 B2 | 4/2006 | Minano et al. |
| 7,118,262 B2 | 10/2006 | Negley |
| 7,213,945 B2 | 5/2007 | Yoneda et al. |
| 7,254,309 B1 | 8/2007 | Chou et al. |
| 7,280,288 B2 | 10/2007 | Loh et al. |
| 7,329,029 B2 | 2/2008 | Chaves et al. |
| 7,348,723 B2 | 3/2008 | Yamaguchi et al. |
| 7,722,227 B2 * | 5/2010 | Zhang et al. ............. 362/364 |
| 7,901,098 B2 | 3/2011 | Saitoh et al. |
| 7,938,559 B2 * | 5/2011 | Angelini et al. ............. 362/241 |
| 2006/0067640 A1 | 3/2006 | Hsieh et al. |
| 2006/0082999 A1 | 4/2006 | Klein |
| 2007/0019416 A1 | 1/2007 | Han et al. |
| 2007/0097693 A1 * | 5/2007 | Klose ............. 362/307 |
| 2007/0177389 A1 | 8/2007 | Pickard et al. |
| 2007/0201225 A1 | 8/2007 | Holder et al. |
| 2007/0258248 A1 | 11/2007 | Duhe |
| 2007/0263393 A1 | 11/2007 | Van De Ven |
| 2008/0084701 A1 | 4/2008 | Van De Ven et al. |
| 2008/0106907 A1 | 5/2008 | Trott et al. |
| 2008/0130298 A1 | 6/2008 | Negley et al. |
| 2009/0067172 A1 * | 3/2009 | Inoue et al. ............. 362/240 |
| 2009/0097262 A1 * | 4/2009 | Zhang et al. ............. 362/364 |

FOREIGN PATENT DOCUMENTS

| | | |
|---|---|---|
| JP | 61185980 | 8/1986 |
| JP | 61214485 | 9/1986 |
| WO | WO9950596 A2 | 10/1999 |
| WO | WO0024062 A1 | 4/2000 |

* cited by examiner

RECESSED LED LIGHTING FIXTURE

RELATED APPLICATION

This application is based in part on U.S. Provisional Application Ser. No. 61/055,958, filed May 23, 2008, the contents of which ate incorporated herein by reference. This application also relates to U.S. application Ser. No. 12/173,721, filed Jul. 15, 2008, the contents of which are incorporated herein by reference.

FIELD OF THE INVENTION

This invention relates to lighting fixtures and, more particularly, to recessed fixtures using LEDs.

BACKGROUND OF THE INVENTION

In recent years, the use of light-emitting diodes (LEDs) for various common lighting purposes has increased, and this trend has accelerated as advances have been made in LEDs and in LED-array bearing devices, often referred to as "LED modules." Indeed, lighting applications which have been served by fixtures using high-intensity discharge (HID) lamps and other light sources are now increasingly beginning to be served by LED modules. Such lighting applications include, among a good many others, roadway lighting, parking lot lighting, factory lighting. Creative work continues in the field of LED module development, and also in the field of using LED modules for light fixtures in various applications, which increasingly extends to interior lighting, including recessed lighting fixtures. It is the latter field to which this invention relates.

Recessed lighting fixtures in general have certain limitations with respect to the size of the area that can be illuminated by a given fixture. A recessed lighting fixture is typically mounted into a ceiling, a wall or some other structure that has an opening through which the light is emitted onto the area to be illuminated. (Given that recessed lighting is most typically used in ceilings, discussions referring to particular building structures will refer to a ceiling; however it is to be understood that no limitation is intended by any such reference.) Lighting-industry standards require that a given light source of a recessed lighting fixture be recessed within the ceiling to a sufficient depth to conceal such light source from a viewer looking at the fixture at an angle (to the vertical axis of the fixture) of 45° or more. Compliance with such standard typically substantially reduces the size of the area below illuminated by the fixture, which in turn may require a greater number of fixtures for illuminating a particular room or large area or may require recessed fixtures with larger openings. This can become a problem when architectural design preferences tend toward fewer fixtures and smaller openings.

There have been various efforts in development of recessed lighting fixtures using LEDs as light sources. However, there is a significant need in the lighting industry for improved recessed light fixtures using LEDs, addressing the problems and concerns referred to above. More specifically, it would be highly desirable to provide an LED-based recessed lighting fixture that provides illumination of large areas while having a relatively small size, as well as improved LED lensing to serve such purposes.

OBJECTS OF THE INVENTION

It is an object of the invention to provide an improved recessed lighting fixture that overcomes some of the problems and shortcomings of the prior art, including those referred to above.

Another object of the invention is to provide an improved recessed lighting fixture that is readily adaptable for a variety of mounting positions and situations.

Another object of the invention is to provide an improved recessed lighting fixture that provides a large-size illumination area while in compliance with lighting-industry standards.

How these and other objects are accomplished will become apparent from the following descriptions and the drawings.

SUMMARY OF THE INVENTION

The present invention is an improvement in recessed lighting fixture for mounting into a structure facing an illumination area. The inventive lighting fixture includes: (1) a support member configured for mounting into the structure and including a from end-portion having an edge defining a light opening and a back end-portion recessed from the opening, the support member and opening having a centerline: (2) a mounting board disposed at the back end-portion and defining with the support member an open space extending to the opening; and (3) an LED arrangement on the mounting board. The LED arrangement includes (a) LED emitters on the mounting board for directing light toward the opening, each emitter defining an emitter axis, and (b) a lens for each emitter at least one of which is off-centerline in a first lateral direction and has its associated lens configured for distribution of the emitter light in off-axial direction across the open space and passing through the opening at an edge portion that is off-centerline in the opposite lateral direction. Such off-axial light distribution widens the illumination angle from the fixture while having no more than minimal light directed onto the support member.

Term "LED emitter," as used herein, refers to an LED light source that may be in a form of an "LED package,"—a term known in the industry, or any other form providing LED-emitted light. Some examples of LED packages have one or multiple number of light-emitting diodes on a base. Such multiple diodes may emit light with the same wave length which produce a common-color light. Alternatively, multiple diodes may emit light of different waive lengths thus different colors which may me blended to achieve a desired-color light. Persons skilled in the art would appreciate a broad variety of available LED emitters.

Term "centerline," as used with reference to the support member and the open space, means a line that indicates a center of at least one lateral dimension. For example, the fixture may have the light opening which is symmetrical along only one of its lateral dimension. In such example, the centerline will be along the axis of such symmetry. Alternatively, the support member may define a light opening having asymmetrical shape. In such case, the centerline will be situated along approximate center of such shape; and the emitter that is off-centerline is preferably in a farthest available position from such approximate center. The term "centerline" is in no way limiting the configuration of the support member or the light opening to any particular shape.

In some highly preferred embodiments, the mounting board is substantially planar.

In most highly preferred embodiments, the mounting board has a peripheral region surrounding a non-peripheral region. In such embodiments, the emitter(s) with the lens(es) configured for off-axial light distribution is/are on the peripheral region and at least one other emitter is on the non-peripheral region. The emitter on the non-peripheral region has its associated lens configured for axial light distribution from the emitter with no more than minimal light directed onto the support member. The peripheral region preferably has an annular shape concentric with the opening.

It should also be understood that some embodiments of the present invention, which have smaller cross-dimension of the light opening, may include only emitters with lenses configured for off-axial light distribution.

In fact, some of such embodiments may have only one emitter with its lens distributing LED light off-axially with respect to the emitter axis toward a preferential side to achieve directional illumination.

Some other embodiments with small-sized light openings may have as few as three emitters each with the lens off-axially distributing its emitter light in a direction radially across the light opening. Therefore, a fixture, which has the light opening with a very small greatest dimension, may provide a very wide light-beam angle allowing illumination of a comparatively large area. Since, LEDs themselves are of a very small size, the size of such fixtures may depend only on the dimensions of the LED lenses. A small overall size of the fixture providing a wide light-beam angle according to the current invention allows the inventive lighting fixture to be mounted into a great variety of small structures, even including such portable structures as flashlights.

The off-axial light distribution, which allows a great widening of an angle at which LED-emitted light exits the fixture, is achieved with LED lenses specifically designed for directing mostly all of light from a selected emitter off-axially. A configuration of the lens surfaces provides a total internal reflection (TIR) allowing a minimal loss of light.

Another aspect of this invention is the lens for directing light from an LED light emitter in a preferential-side off-axial direction with respect to the emitter axis. Such preferential-side off-axial light distribution provides a significant widening of the angle at which light exits a recessed lighting fixture, thus providing illumination of a broader area without enlarging the fixture size. Such off-axial light distribution from a light emitter is achieved with a lens positioned over the emitter which lens is specifically designed for directing a majority of light toward a preferential side.

The inventive lens includes an emitter-adjacent base end which forms a light-receiving opening, an inner surface extending from the base end and forming a void, an output-end surface configured to direct light toward the preferential side, and an outer lateral surface configured for TIR to direct light toward the output-end surface. The inner surface includes a surrounding lateral surface formed about the emitter axis and an end surface configured to direct light toward the preferential side. The surrounding lateral surface is preferably a substantially cylindrical surface, and most preferably has a right cylindrical shape of substantially circular cross-section. The light from the emitter exits the output-surface predominantly toward the preferential side.

The term "predominantly," as used herein with respect to the light which exits the output-end surface of the inventive lens, means that the output-end surface is configured such that of the light which reaches the output-end surface a great majority exits the output-end surface toward the preferential side.

The configuration of the surfaces of the lens defines a high efficiency of light output which achieves minimal losses of light. The inventive lens has about 80-95% efficiency in usage of emitter light. In certain preferred embodiments only about 13% of light from the emitter is lost (not directed for useful illumination).

The term "right cylindrical shape" means a surface generated by a straight line moving substantially parallel to the emitter axis along a full annular path, regardless of its shape.

A preferred right cylindrical shape is generated by a substantially circular path of line movement, and most preferably is a surface which is coaxial with the emitter axis.

Many other configurations for the surrounding lateral surface are possible, including without limitation surfaces generated by movement of a line which is other than straight. In some alternative embodiments, the surrounding lateral surface may have various annular shapes, including shapes having different cross-sectional configurations at different positions therealong. The surrounding lateral surface may be angled with respect to the emitter axis.

In the preferred embodiment of this invention, the end surface preferably has a substantially planar portion angled toward the preferential side and transitioning from near the emitter axis to a convex portion that is on a non-preferential side and meets the surrounding lateral surface at a position farthest from the base end.

In preferred embodiments, the outer lateral surface extends from the base end to terminate proximal to the output-end surface at distances from the emitter axis which are greatest on the preferential side and gradually decrease toward a non-preferential side. The outer lateral surface has angles of divergence with respect to the emitter axis which are the greatest on the preferential side and gradually decrease toward the non-preferential side. The outer lateral surface may have been formed by substantially straight lines. In the illustrated preferred embodiment, the outer lateral surface is formed by a curved line forming a substantially convex shape.

The angles of the outer lateral surface create varying distances at which the outer lateral surface terminates with respect to the emitter axis. Such distances may define an output-end axis substantially parallel to the emitter axis and offset therefrom toward the preferential side. The angles of the outer surface are measured in planes which include the emitter axis. The inventive lens is most typically bilaterally symmetric.

In preferred embodiments of this invention, the output-end surface is substantially planar. The emitter-adjacent base end is preferably a planar surface which is substantially perpendicular to the emitter axis. The output-end surface is preferably angled toward a non-preferential side, with the edge of such output-end surface on the preferential side being farthest from the plane of the base end.

In highly preferred embodiments, each lens for preferential-side off-axial light distribution is a separate piece over its associated emitter. It is preferred that each such lens include an outward flange about the outer lateral surface. The outward flange preferably includes a reference mark indicating an orientation of the preferential side during installation of the lens over its associated emitter.

In preferred embodiments, the light emitter used with the lens of this invention is an LED package including at least one LED and a primary lens over the LED, making the lens of this invention a secondary lens placed over the primary lens. The primary lens has an illumination pattern which is substantially rotationally symmetric around the emitter axis, and in certain embodiments, the primary lens is substantially hemispherical.

The configuration of surfaces of the lens of this invention will be based on the intended application of the lens and the desired proportion of the light to be emitted toward the preferential side. In some embodiments, the lens is configured to direct about 75% of emitted light toward the preferential side and about 12% toward a non-preferential direction. In some other embodiments, the lens surfaces may be configured for directing about 55% toward the preferential side and 45% toward the non-preferential side, for example, the lens may be configured to produce a round footprint for a illuminating the ground or to produce a rectangular footprint for a wall-wash application.

The term "angled toward," as used herein with respect to lens surfaces, refers to the light-exit side of the interface between two mediums (lens and air) from which the light moves. More specifically, if the light moves from air to lens material, then the "angled toward" refers to that side of the interface which faces the lens material. On the other hand, if the light moves from the lens material to air, then the "angled toward" refers to the air side of the interface.

The term "preferential side," as used herein with respect to the light-distribution direction, means the lateral direction (with respect to the emitter axis) toward which illumination is desired. The term "non-preferential side," as used herein with respect to the direction of the light distribution, means the lateral direction toward which illumination is not desired. The non-preferential side is typically substantially radially opposite from the preferential side.

DETAILED DESCRIPTION OF PREFERRED EMBODIMENTS

Figure 1:
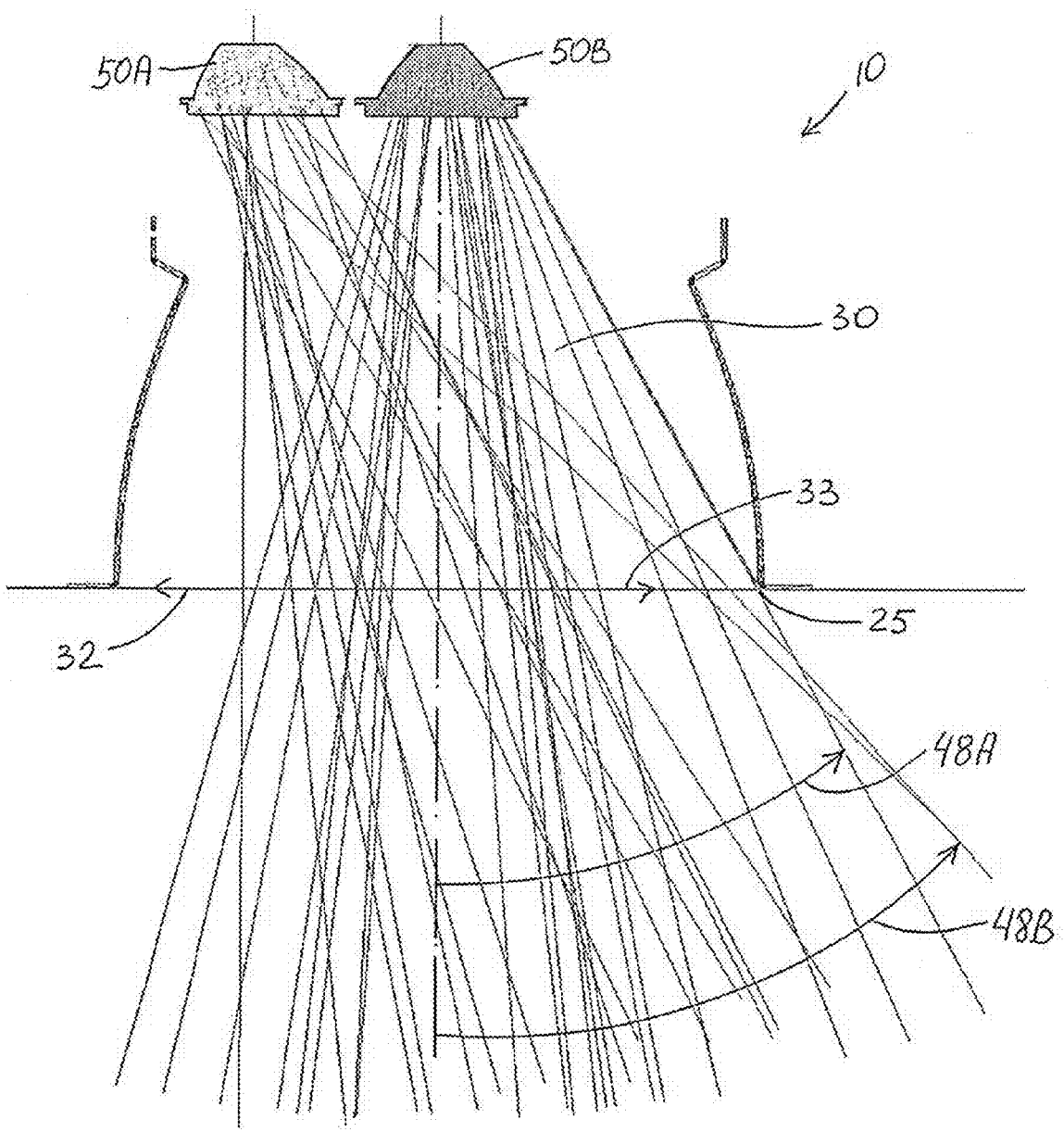
FIG. 1 is a schematic side view of a recessed LED lighting fixture showing distribution of light in off-axial and axial direction with respect to the emitter axis by LED lenses in accordance with this invention.

FIGS. 1-10 illustrate preferred embodiments of the recessed lighting fixture 10 for mounting into a structure 12 facing an illumination area 14. Lighting fixture 10 includes a support member 20 configured for mounting into structure 12. Support member includes a front end-portion 22 having an edge 24 defining a light opening 16 and a back end-portion 26 recessed from opening 16. Support member 20 and opening 16 have a centerline 28. Lighting fixture 10 further includes a mounting board 18 with an LED arrangement 40 including LED emitters 42 on mounting board 18 for directing light 46 toward opening 16 and a lens 50 for each emitter 42. Mounting board 18 is disposed at back end-portion 26 and together with support member 20 defines an open space 30 extending to opening 16. Each emitter 42 defines an emitter axis 44. At least one of emitters 42 is off-centerline in a first lateral direction 32 and has its associated lens 50A configured for distribution of light from emitter 42 in off-axial direction with respect to the emitter axis across open space 30 and passing through opening 16 at an edge portion 25 that is off-centerline in the opposite lateral direction 33. Such off-axial light distribution widens the illumination angle 48 from fixture 10 while having no more than minimal light 46 directed onto support member 20.

FIGS. 1, 2, 5-8 show lenses 50 as separate pieces each over its associated emitter 42. However, it should be recognized that in certain light-fixture uses utilizing a plurality of lenses 50, such as the fixtures illustrated in FIGS. 1-10, lenses 50 could be incorporated into a single formed member with each lens oriented in the desired direction.

Figure 2:
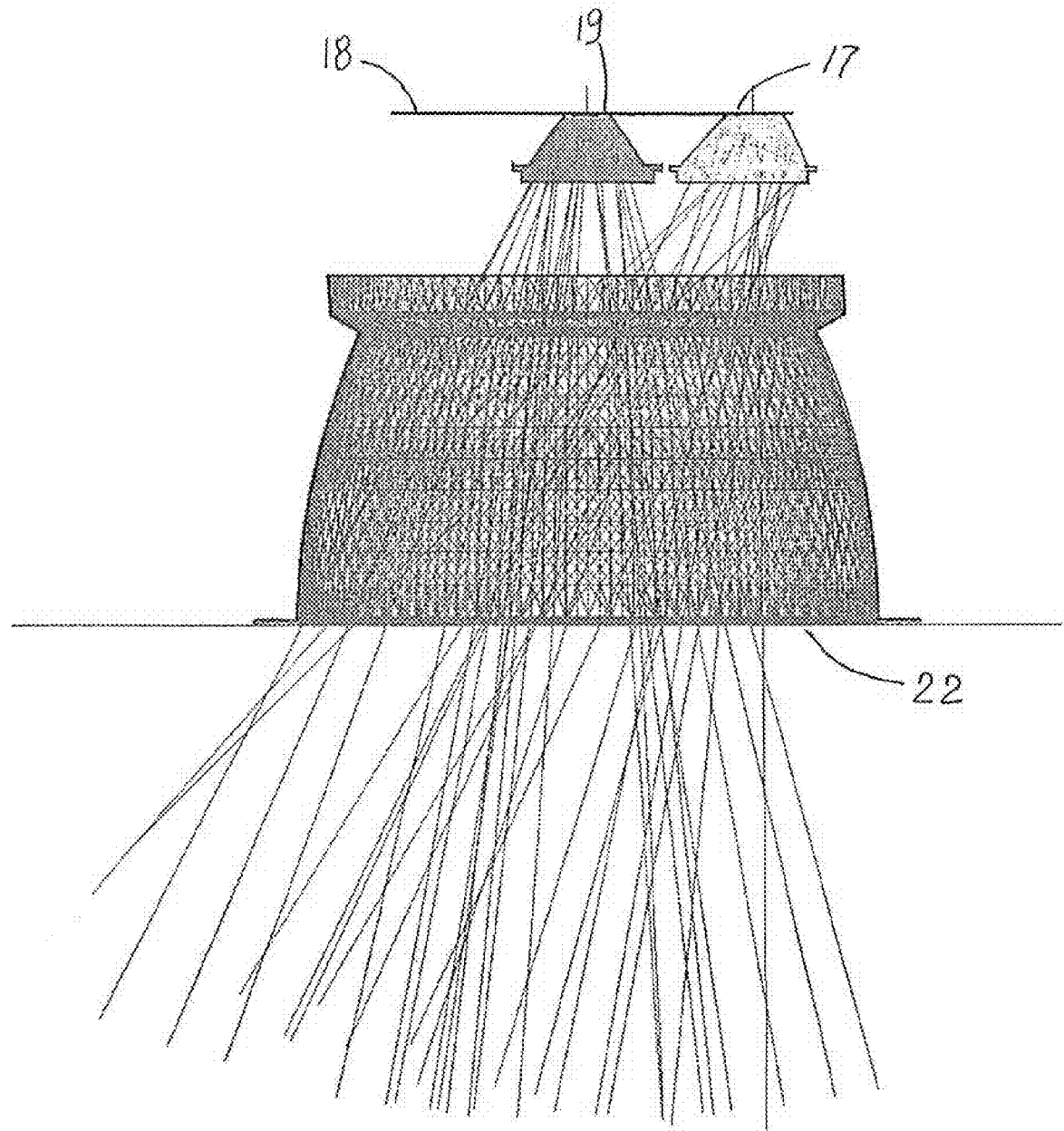
FIG. 2 is another schematic side view of the recessed LED lighting fixture as in FIG. 1 showing a part of the support member.
Figure 3:
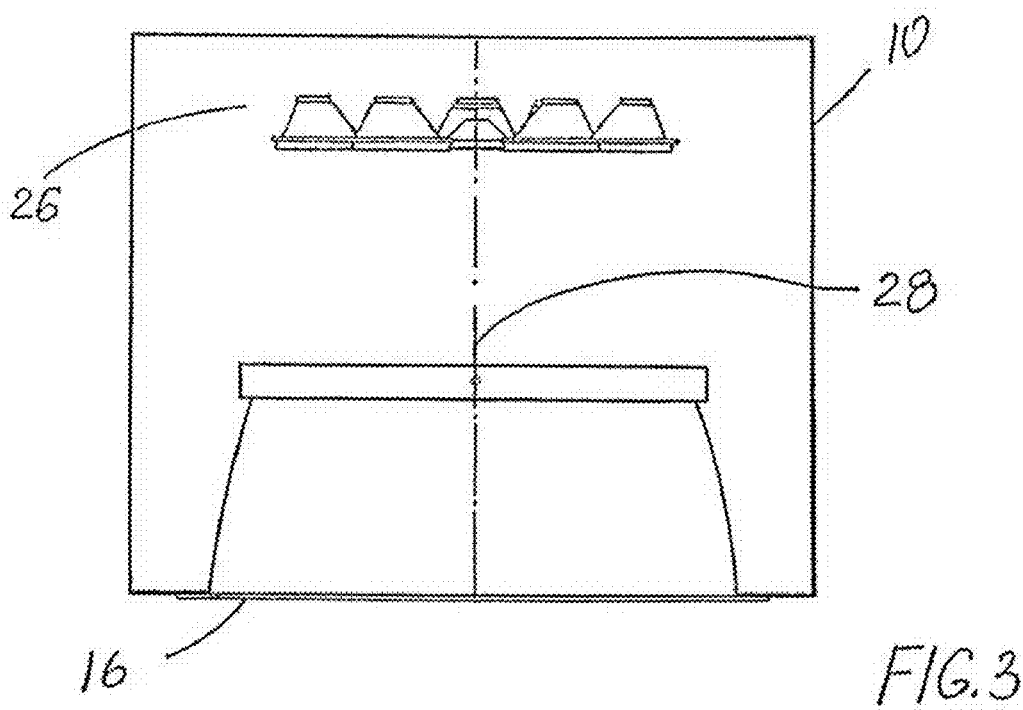
FIG. 3 is another schematic side view of the recessed LED lighting fixture showing an LED assembly and a part of the support member.
Figure 4:
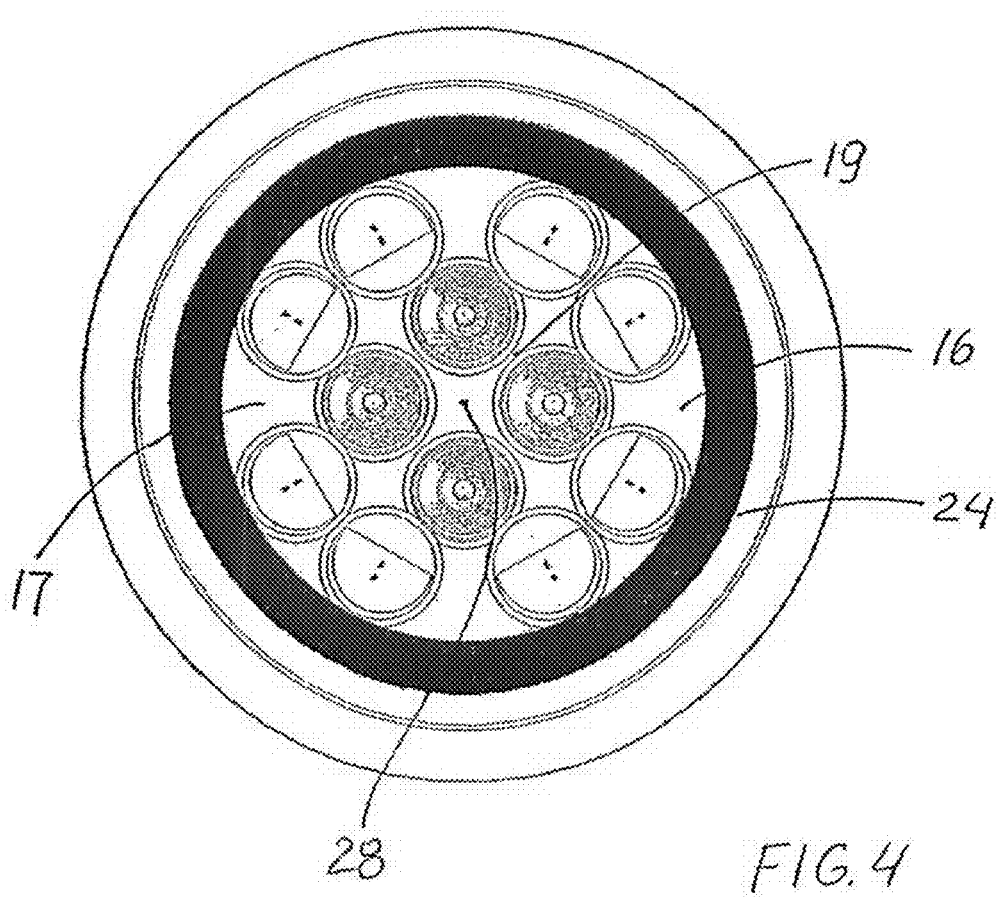
FIG. 4 is a bottom view of the recessed LED lighting fixture, as shown in FIG. 3.
Figure 5:
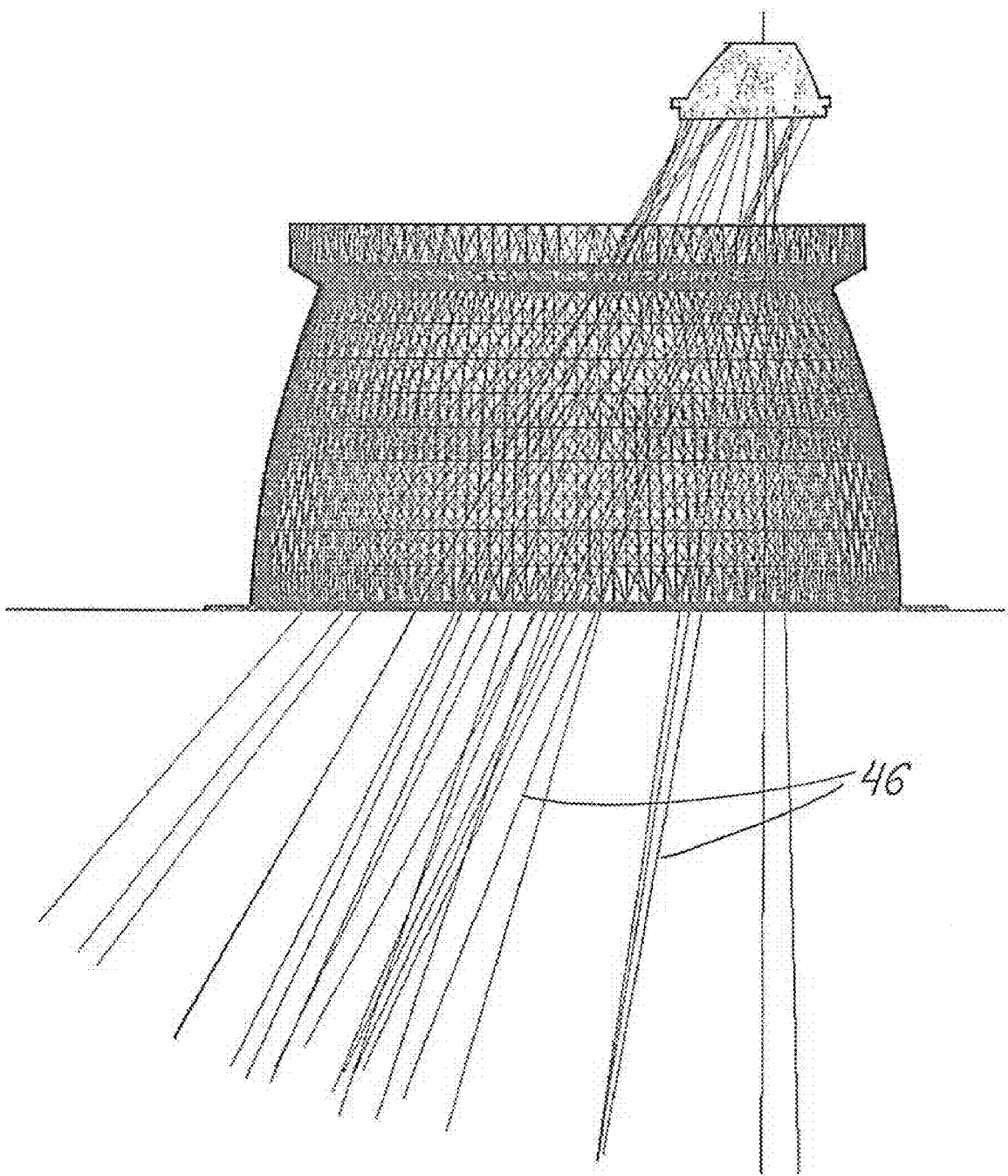
FIG. 5 is a schematic side view of the recessed LED lighting fixture showing only off-axial light distribution by LED lens in accordance with this invention.
Figure 6:
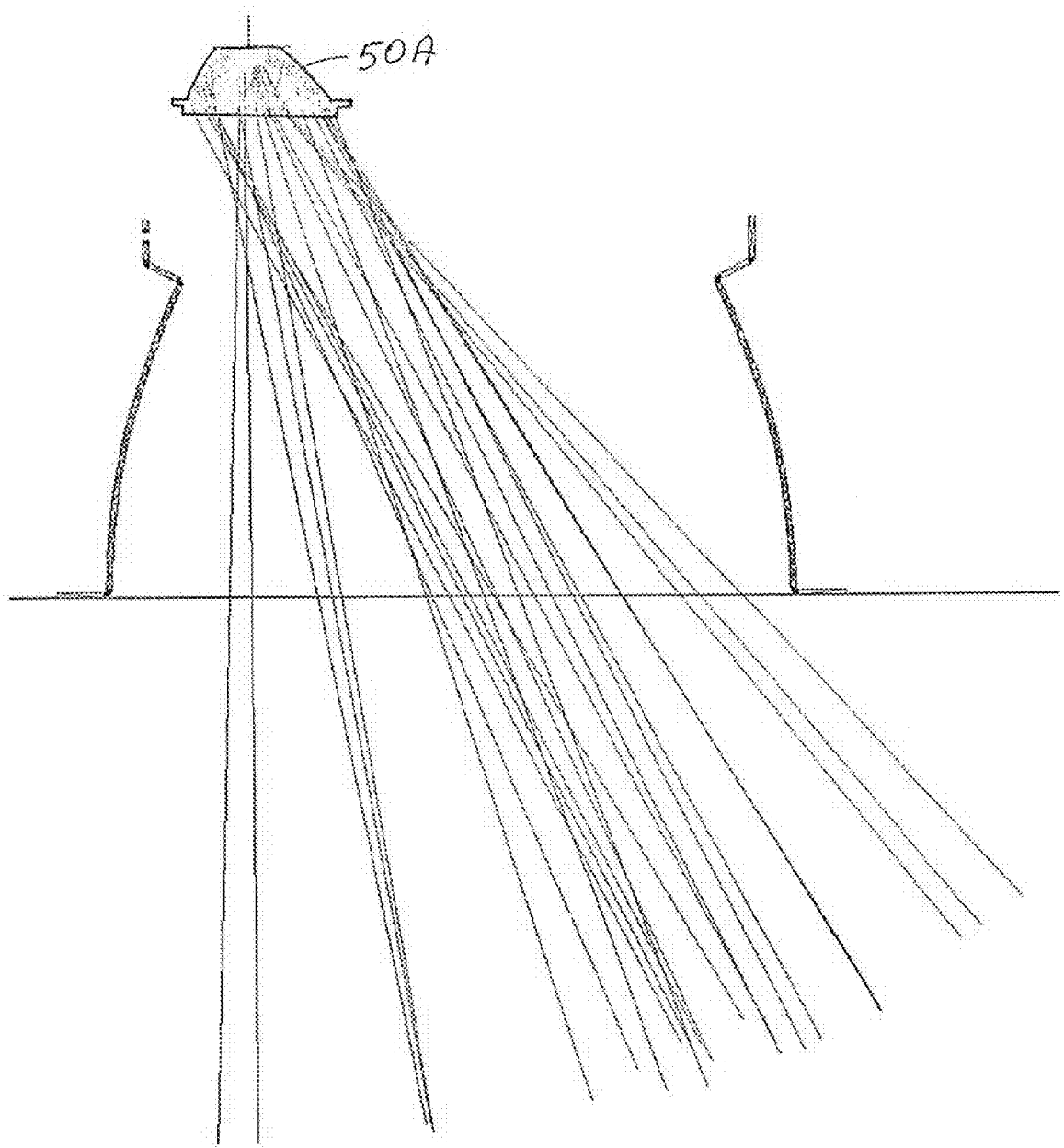
FIG. 6 is another schematic side view of the recessed LED lighting fixture now fully showing only off-axial light distribution.
Figure 7:
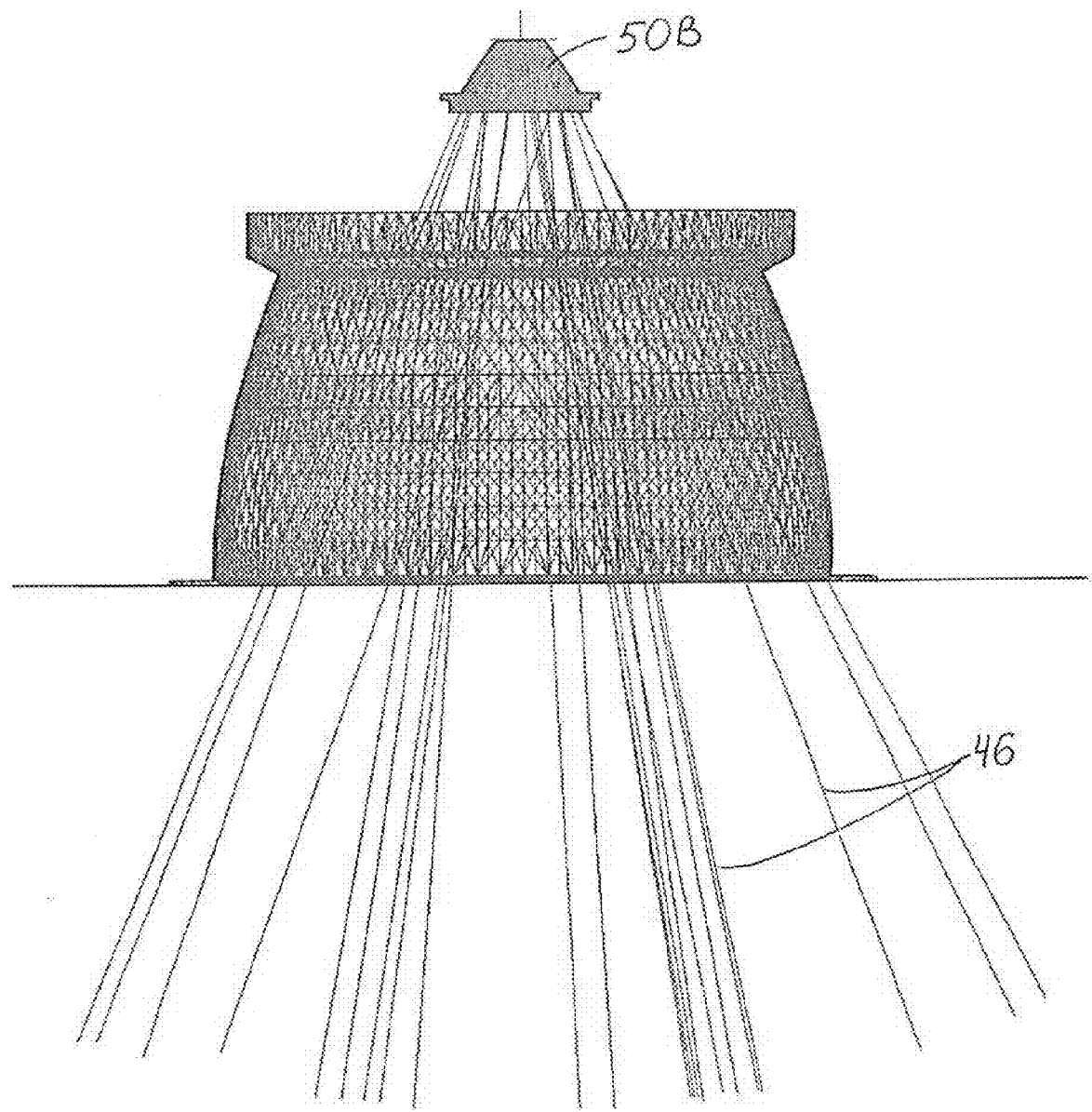
FIG. 7 is a schematic side view of the recessed LED lighting fixture showing only axial light distribution by LED lens in accordance with this invention.
Figure 8:
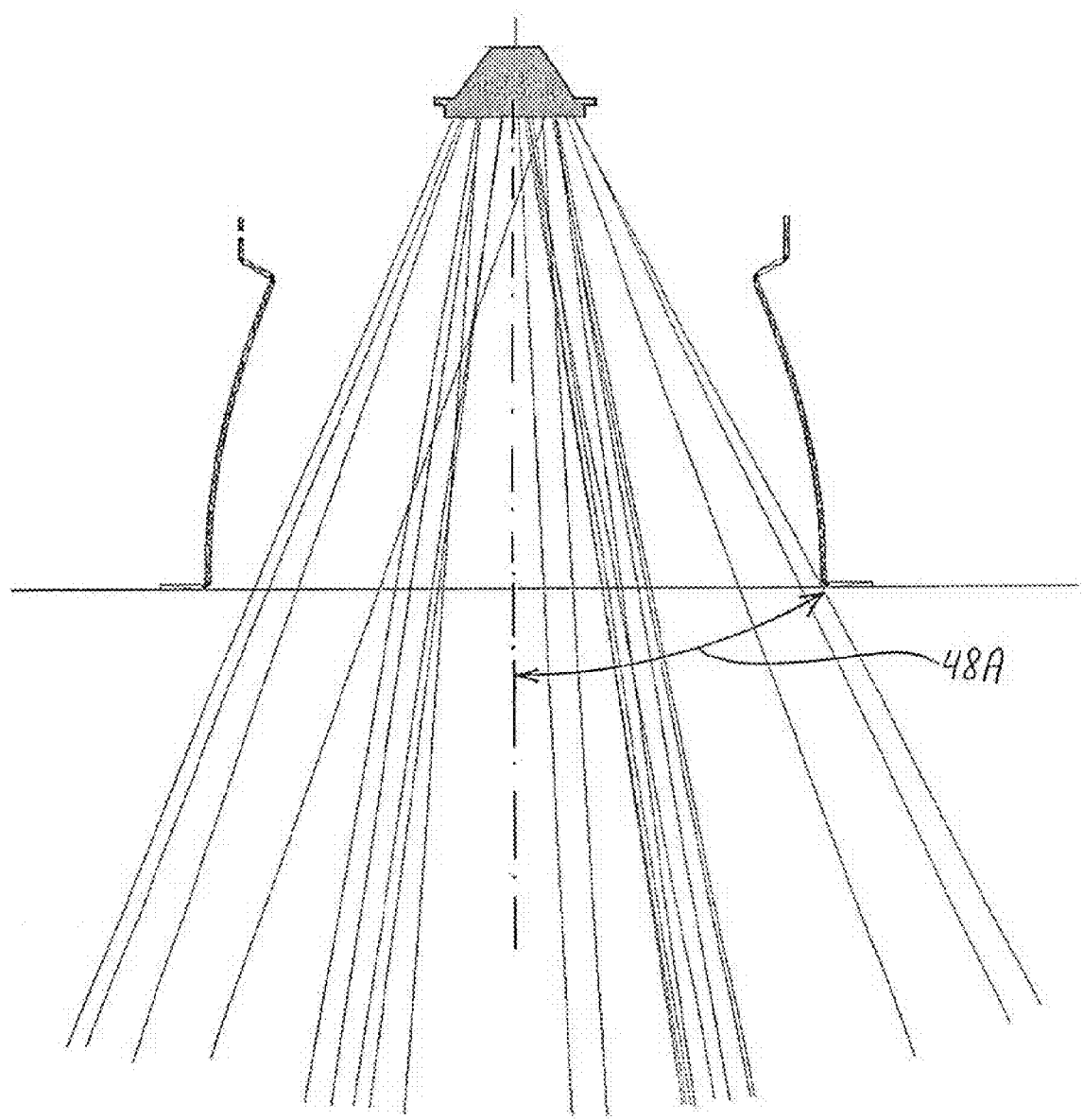
FIG. 8 is another schematic side view of the recessed LED lighting fixture now fully showing only axial light distribution.
Figure 9:
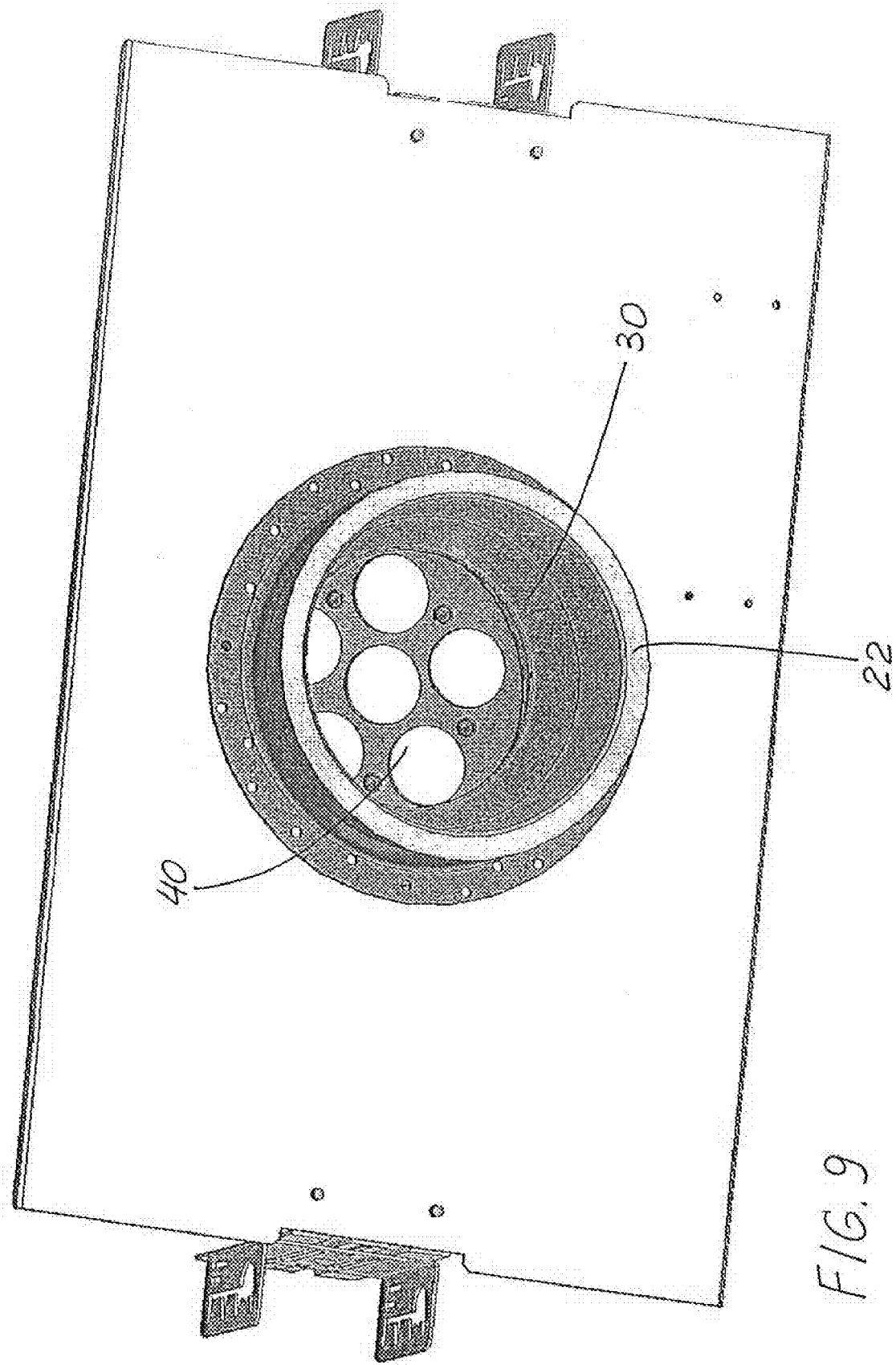
FIG. 9 is a bottom perspective view of the recessed LED lighting fixture.
Figure 10:
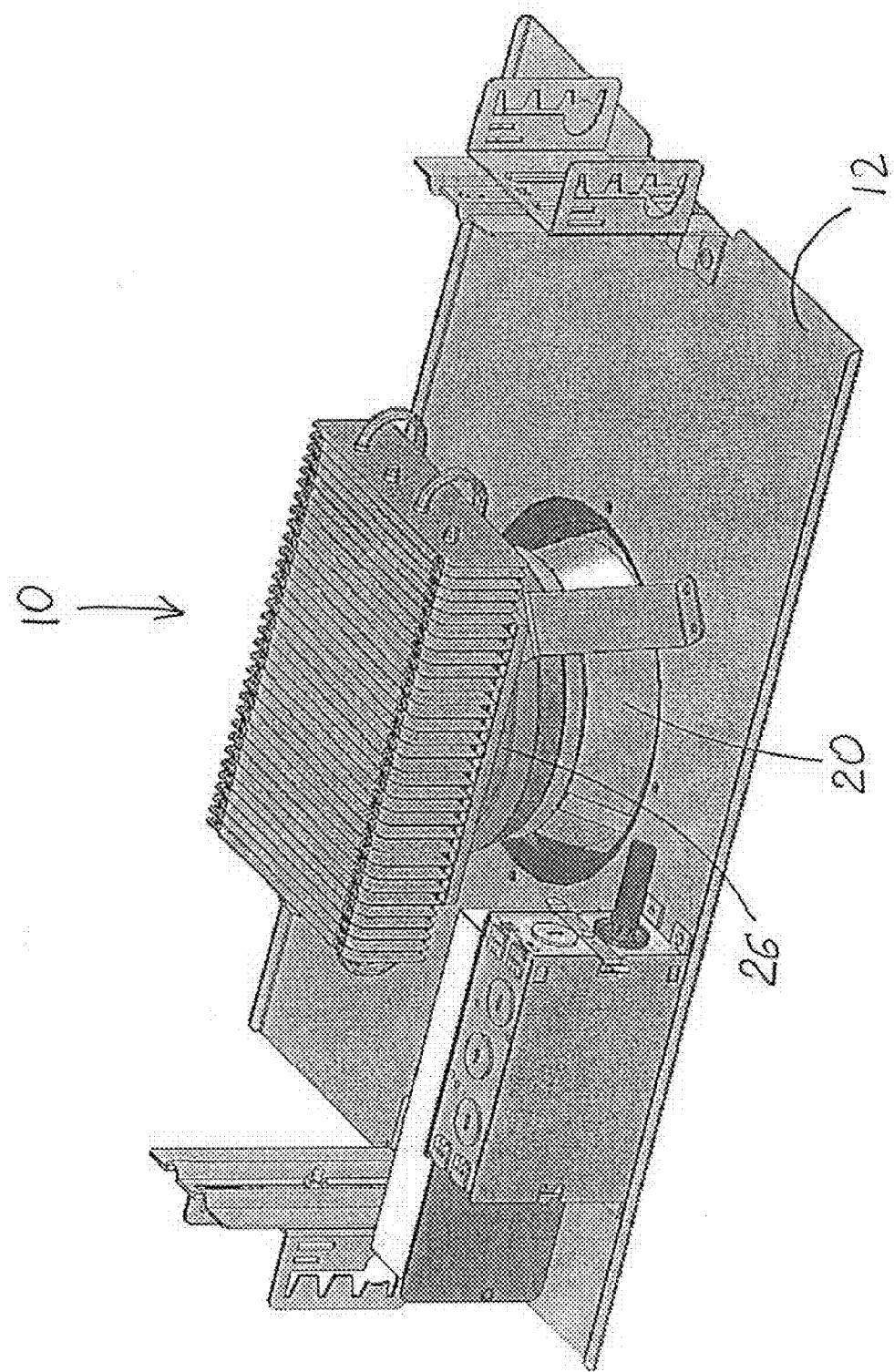
FIG. 10 is a top perspective view of the recessed LED lighting fixture.

FIG. 2 best shows mounting board 18 being substantially planar. As best shown in FIGS. 2 and 4, mounting board 18 has a peripheral region 17 surrounding a non-peripheral region 19. Emitters 42 with lenses 50A configured for off-axial light distribution are on peripheral region 17 and at least one other emitter 42 is on non-peripheral region 19. Emitter 42 on non-peripheral region 19 has lens 50B configured for axial light distribution from emitter 42 with no more than minimal light 46 directed onto support member 20. Peripheral region 17 has an annular shape concentric with the opening, as best seen in FIGS. 3, 4 and 9.

FIGS. 11-18 illustrate another aspect of this invention, which is lens 50A for directing light from a light emitter 42 in a preferential-side off-axial direction with respect to emitter axis 44. FIGS. 1-10 illustrate preferred embodiments of recessed lighting fixture 10 utilizing lens 50A.

Figure 11:
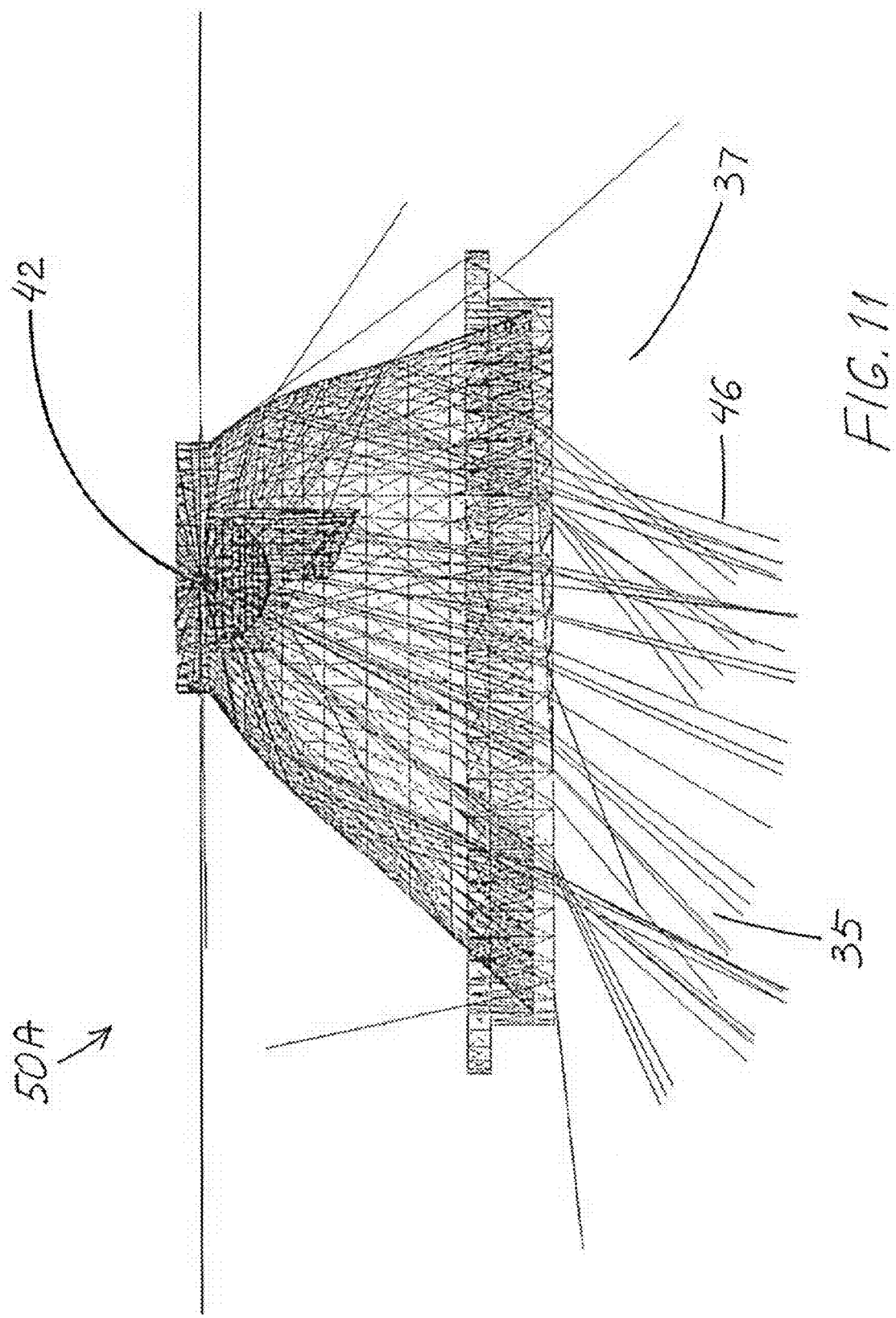
FIG. 11 is a enlarged side view of a lens for off-axial light distribution showing such off-axial light distribution.
Figure 12:
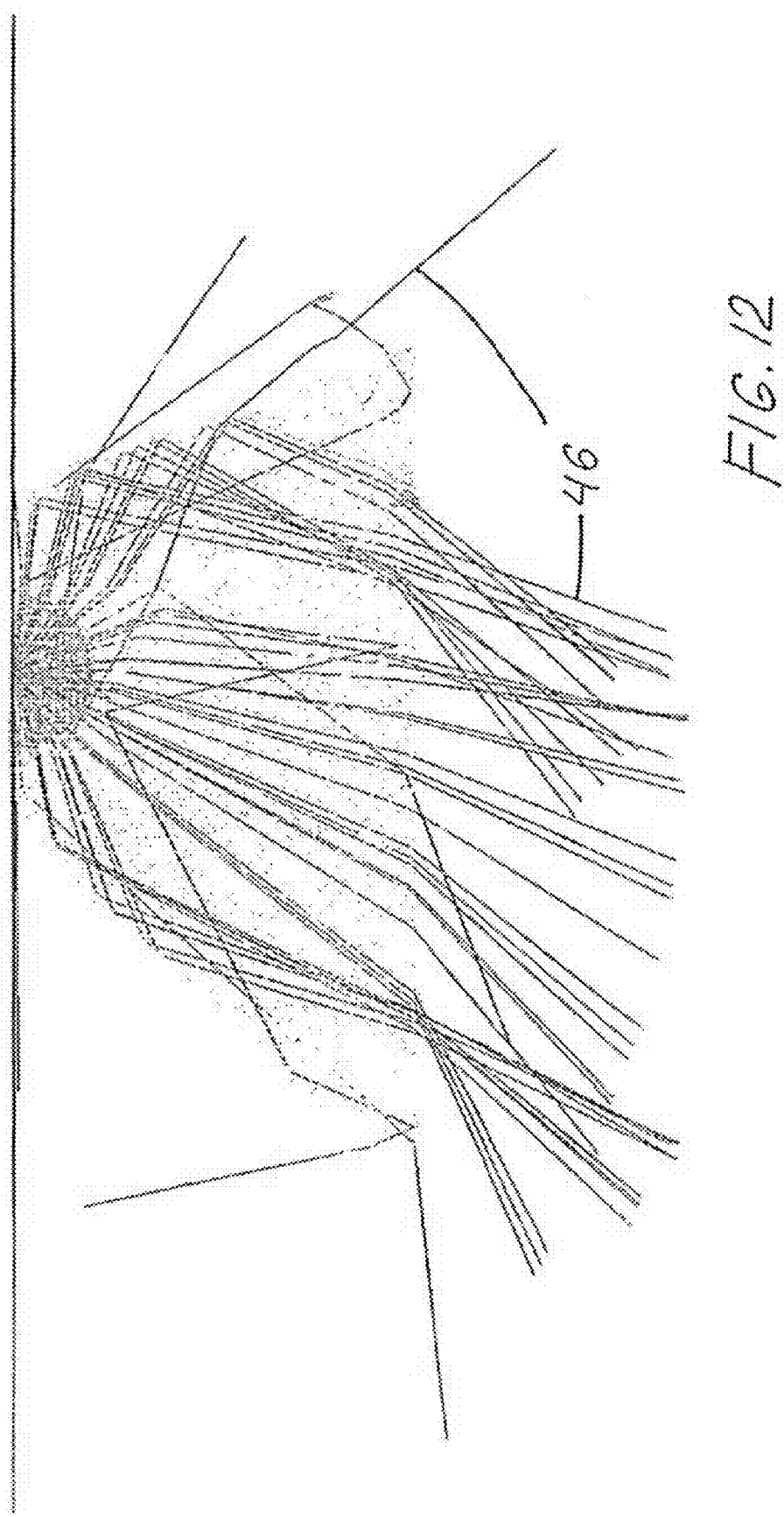
FIG. 12 is an enlarged side view of the off-axial light distribution by the lens of FIG. 11.

Lens 50A includes: an emitter-adjacent base end 52 which forms a light-receiving opening 52A: an inner surface 54 extending from base end 52 and forming a void 54A, an output-end surface 57 configured to direct light 46 toward preferential side 35, and an outer lateral surface 59 configured for TIR to direct light 46 toward output-end surface 57. Inner surface 54 includes a surrounding lateral surface 55, which is of circular cylindrical configuration concentrically formed about emitter axis 44, and an end surface 56 configured to direct light 46 toward preferential side 35. As best seen in FIGS. 11 and 12, light 46 from emitter 42 exits output-surface 57 predominantly toward preferential side 35.

Figure 15:
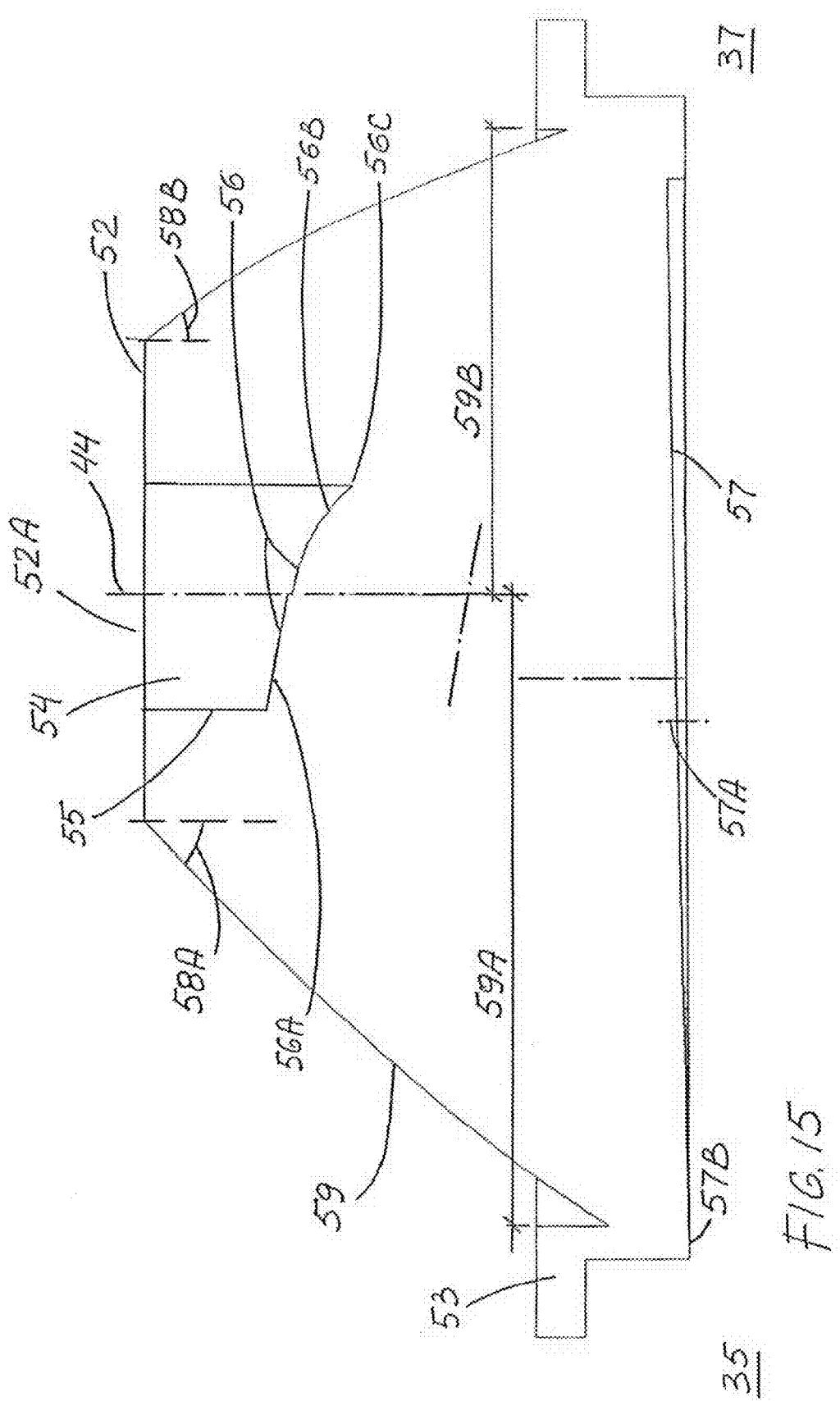
FIG. 15 is a greatly enlarged cross-sectional view along lines 15-15 of the lens of FIG. 11.
Figure 16:
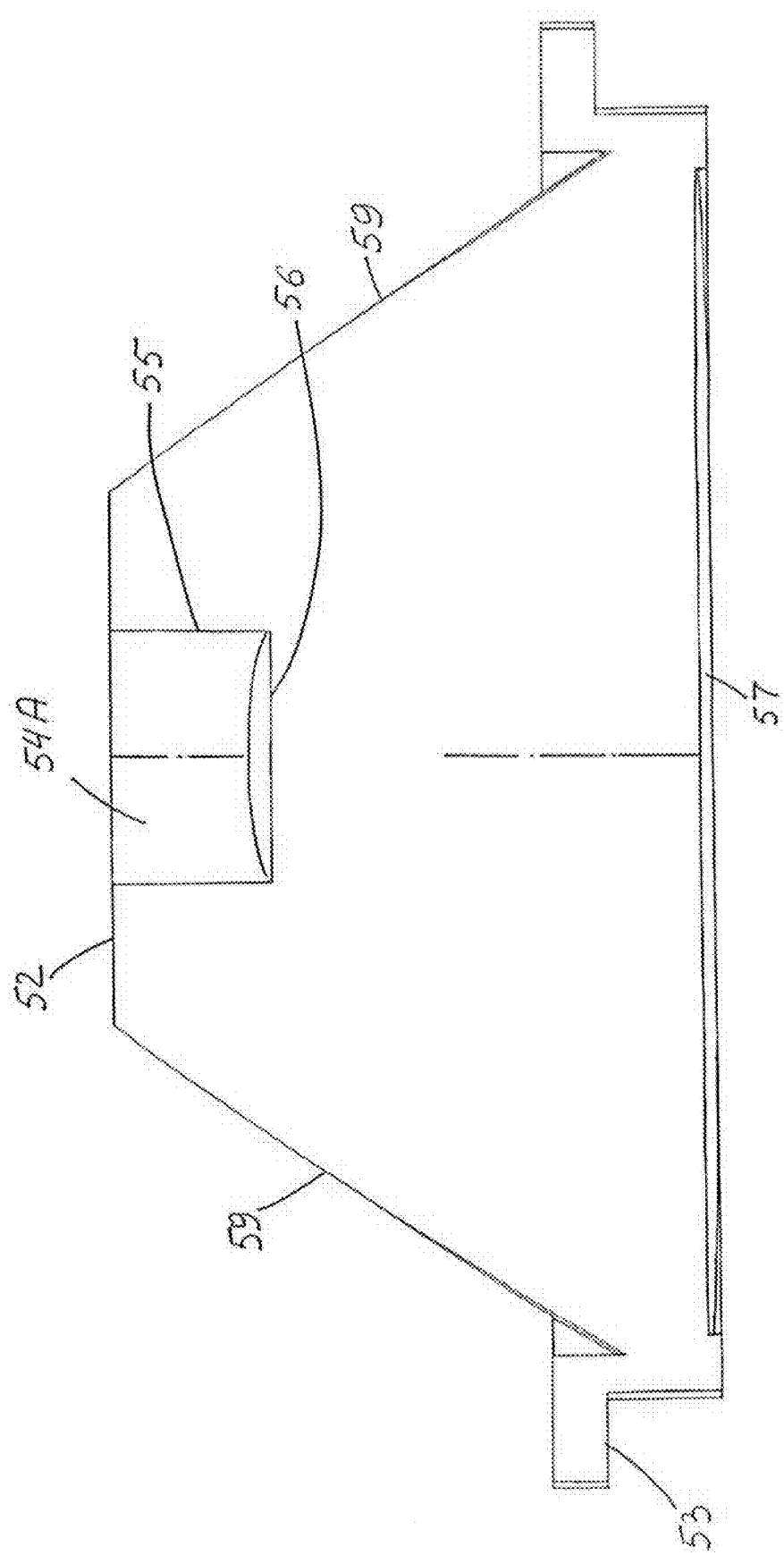
FIG. 16 is a greatly enlarged cross-sectional view along lines 16-16 of the lens of FIG. 11.
Figure 17:
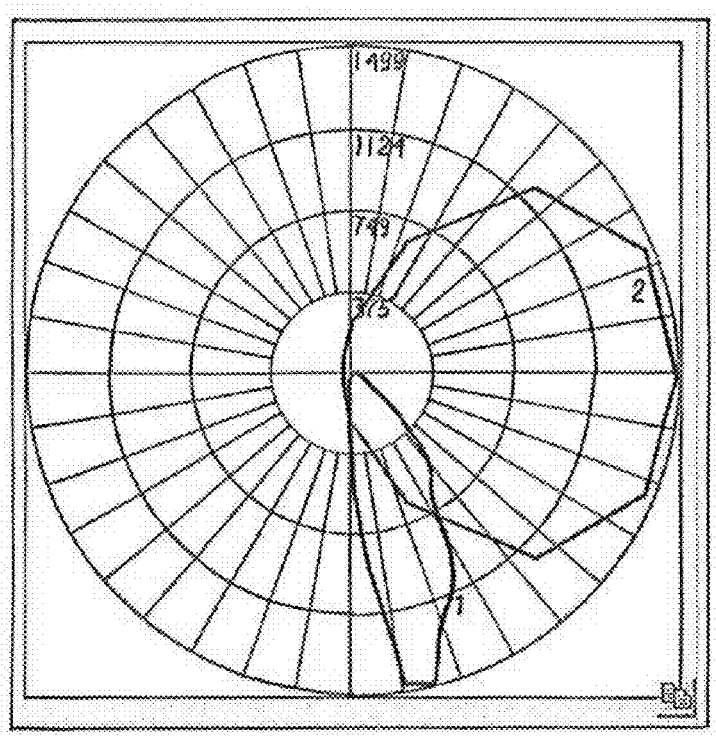
FIG. 17 is a polar candela curves of the off-axial light distribution by the lens according to the invention.
Figure 18:
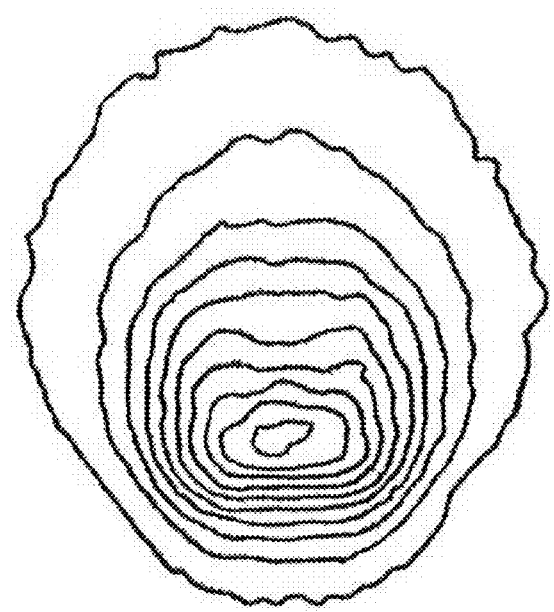
FIG. 18 is an isofootcandle plot of the off-axial light distribution by the lens according to the invention.

As best seen in FIGS. 15 and 16, end surface 56 has a substantially planar portion 56A angled toward preferential side 35 and transitioning from near emitter axis 44 to a convex portion 56B. As best illustrated in FIG. 15, convex portion 56B is on a non-preferential side 37 and meets surrounding lateral surface 55 at a position 56C farthest from base end 52.

Figure 13:
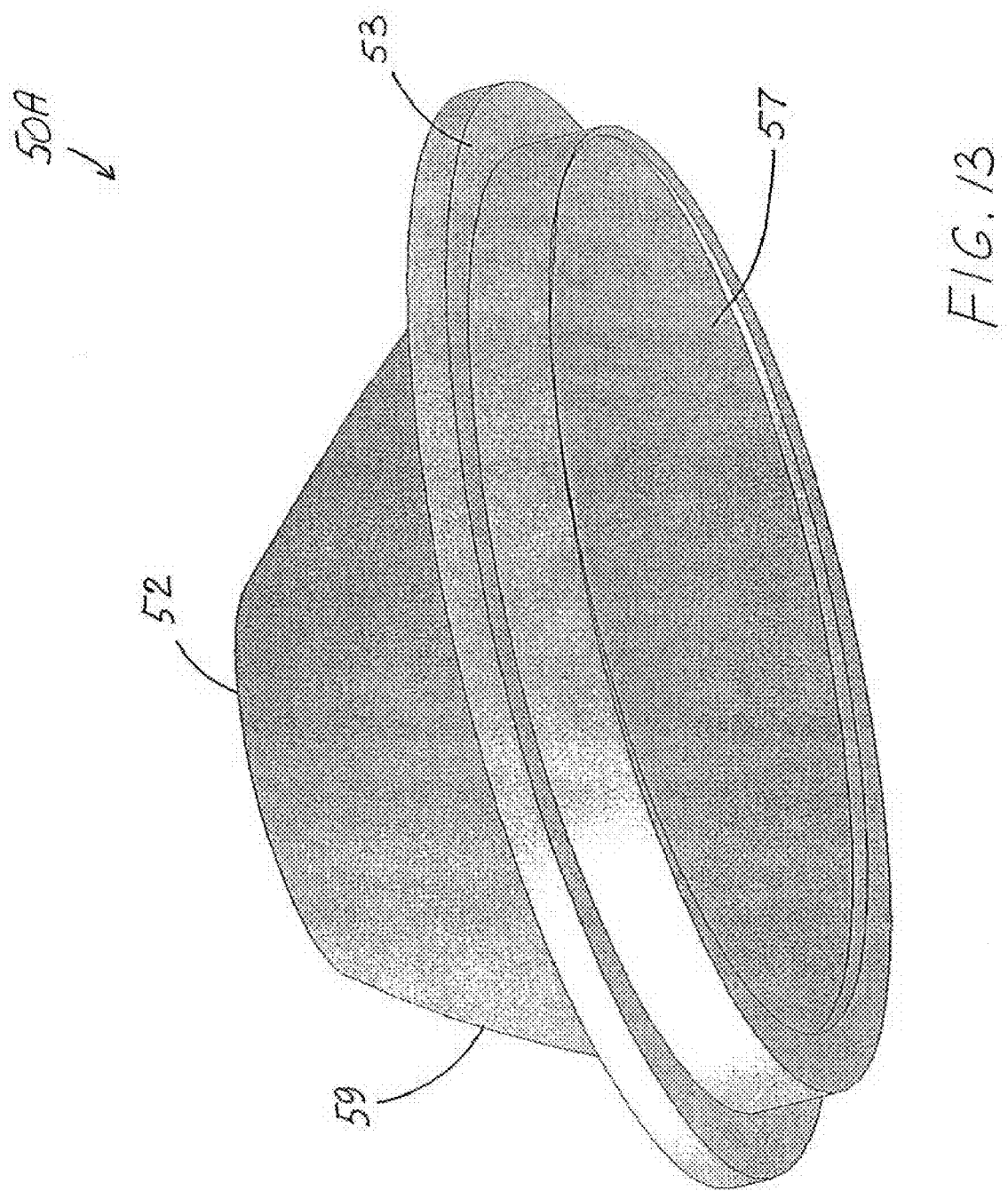
FIG. 13 is an enlarged perspective view of the lens of FIG. 11.
Figure 14:
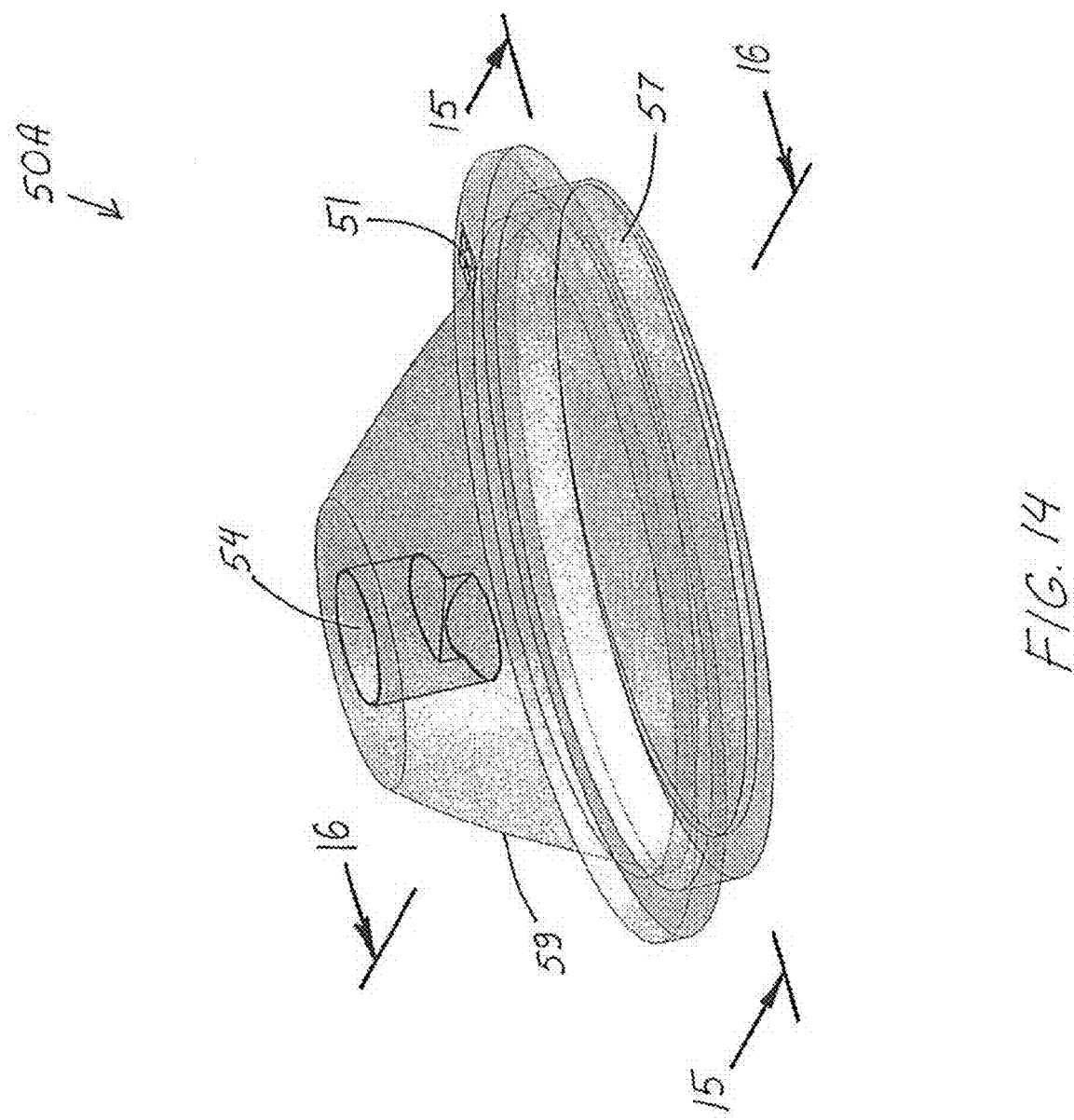
FIG. 14 is an enlarged transparent perspective view of the lens of FIG. 11 showing an inner surface.

FIGS. 13-15 best show that outer lateral surface 59 extends from base end 52 to terminate proximal to output-end surface 57 at distances from emitter axis 44 which are greatest 59A on preferential side 35 and gradually decrease to 59B toward non-preferential side 37. Outer lateral surface 59 has angles of divergence with respect to emitter axis 44 which are the greatest on preferential side 35 (e.g., angle 58A) and gradually decrease toward non-preferential side (e.g., angle 58B). Distances 59A and 59B and angles 58A and 58B define an output-end axis 57A which is substantially parallel to LED-light emitter axis 44 and offset therefrom toward preferential side 35.

As further seen in FIG. 15, output-end surface 57 is substantially planar. Emitter-adjacent base end 52 is a planar surface which is substantially perpendicular to emitter axis 44. Output-end surface 57 is angled toward non-preferential side 37, with an edge 57B of output-end surface 57 on preferential side 35 being farthest from the plane of base end 52.

As seen in FIGS. 11, 13-16, lens 50A includes an outward flange 53 around outer lateral surface 59. FIG. 14 shows that outward flange 53 includes a reference mark 51 indicating the orientation of preferential side 35, which is helpful during installation of lens 50A over its associated emitter 42.

While the principles of the invention have been shown and described in connection with specific embodiments, it is to be understood that such embodiments are by way of example and are not limiting.

The invention claimed is:

1. A recessed lighting fixture for mounting into a structure facing an illumination area, comprising:
    a support member configured for mounting into the structure and including a front end-portion having an edge defining a light opening and a back end-portion recessed from the light opening, the support member and light opening having a centerline;
    a mounting board disposed at the back end-portion and defining with the support member an open space extending to the light opening; and
    an LED arrangement including (a) LED emitter(s) on the mounting board for directing light toward the light opening, each emitter defining an emitter axis, and (b) a lens for each emitter, at least one emitter being off-centerline in a first lateral direction and having the associated lens configured for distribution of light therefrom in off-axial direction with respect to the corresponding emitter axis across the open space and passing through the opening at an edge portion that is off-centerline in the opposite lateral direction, thereby to widen the illumination angle from the fixture while having no more than minimal light directed onto the support member.

2. The recessed lighting fixture of claim 1 wherein the mounting board is substantially planar.

3. The lighting fixture of claim 1 wherein each lens is a separate piece over the associated emitter.

4. The recessed lighting fixture of claim 1 wherein:
    the mounting board has a peripheral region surrounding a non-peripheral region;
    the emitter(s) with the lens(es) configured for off-axial light distribution is/are on the peripheral region; and
    at least one other emitter on the non-peripheral region and having the associated lens configured for distribution of light therefrom in axial direction with respect to the emitter axis with no more than minimal light directed onto the support member.

5. The lighting fixture of claim 4 wherein the peripheral region has an annular shape concentric with the opening.

6. The lighting fixture of claim 1 wherein each lens for directing light in a preferential-side off-axial direction with respect to the emitter axis includes:
    an emitter-adjacent base end forming an opening;
    an inner surface extending from the base end with (a) a surrounding lateral surface formed about the emitter axis and (b) an end surface configured to direct light toward the preferential side, the inner surface forming a void;
    an output-end surface configured to direct light toward the preferential side; and
    an outer lateral surface configured for TIR to direct light toward the output-end surface,
whereby light from the emitter exits the output-end surface predominantly toward the preferential side.

7. The lighting fixture of claim 6 wherein the surrounding lateral surface is substantially cylindrical.

8. The lighting fixture of claim 7 wherein the substantially cylindrical lateral surface has a right cylindrical shape of substantially circular cross-section.

9. The lens of claim 6 wherein the inner end surface has a substantially planar portion angled toward the preferential side and transitioning from near the emitter axis to a convex portion that is on a non-preferential side and meets the surrounding lateral surface at a position farthest from the base end.

10. The lighting fixture of claim 9 wherein the outer lateral surface extends from the base end to terminate proximal to the output-end surface at distances from the emitter axis which are greatest on the preferential side and gradually decrease toward a non-preferential side.

11. The lighting fixture of claim 10 wherein the outer lateral surface has angles of divergence with respect to the emitter axis which are the greatest on the preferential side and gradually decrease toward the non-preferential side.

12. The lighting fixture of claim 6 wherein the output-end surface is substantially planar.

13. The lighting fixture of claim 12 wherein the emitter-adjacent base end is a planar surface which is substantially perpendicular to the emitter axis.

14. The lighting fixture of claim 13 wherein the output-end surface is angled toward a non-preferential side, with the edge of such output-end surface on the preferential side being farthest from the plane of the base end.

15. The lighting fixture of claim 6 wherein the lens further includes an outward flange about the outer lateral surface.

16. The lighting fixture of claim 15 wherein the outward flange includes a reference mark indicating an orientation of the preferential side during installation of the lens over the emitter.

17. A recessed lighting fixture for mounting into a structure facing an illumination area, comprising:
    a support member configured for mounting into the structure and including a front end-portion having an edge defining a light opening and a back end-portion recessed from the opening, the support member and light opening having a centerline;
    a mounting board disposed at the back end-portion and defining with the support member an open space extending to the opening;
    at least one LED emitter on the mounting board for directing light toward the opening, the emitter defining an emitter axis; and
    a lens for the emitter, the emitter being off-centerline in a first lateral direction, the lens being configured for distribution of light from the emitter in off-axial direction with respect to the emitter axis across the open space and passing through the opening at an edge portion that is off-centerline in the opposite lateral direction, thereby to widen the illumination angle from the fixture while having no more than minimal light directed onto the support member.

18. The lighting fixture of claim 17 wherein the mounting board is substantially parallel to a light-opening plane.

19. The lighting fixture of claim 17 wherein the lens is configured for directing light predominantly toward a preferential side, the lens includes:

an emitter-adjacent base end forming an opening;

an inner surface extending from the base end with (a) a surrounding lateral surface formed about the emitter axis and (b) an end surface configured to direct light toward the preferential side, the inner surface forming a void;

an output-end surface configured to direct light toward the preferential side; and an outer lateral surface configured for TIR to direct light toward the output-end surface such that light from the emitter exits the output-end surface predominantly toward the preferential side.

* * * * *